United States Patent [19]

Liekens et al.

[11] 4,422,215
[45] Dec. 27, 1983

[54] SHEATHED HOLLOW STICK OF SHIRRED CASING

[75] Inventors: J. Alfons F. Liekens, Olen; Ivo G. M. Hendriks, Overpelt, both of Belgium

[73] Assignee: Teepak, Inc., Chicago, Ill.

[21] Appl. No.: 267,283

[22] Filed: May 27, 1981

[51] Int. Cl.³ .......................... B65B 5/00; B65B 11/00
[52] U.S. Cl. ................................... 17/1 R; 138/118.1;
138/109; 206/802
[58] Field of Search ...................... 17/1 R, 1 F, 42, 41,
17/49, 33; 426/140; 206/802; 138/118.1, 109, 121

[56] References Cited

U.S. PATENT DOCUMENTS

| 2,878,628 | 3/1959 | Curry. | |
|---|---|---|---|
| 3,639,130 | 2/1972 | Eichin et al. | |
| 3,828,823 | 8/1974 | Douglas | 138/109 |
| 4,007,761 | 2/1977 | Beckman | 17/33 X |
| 4,033,382 | 7/1977 | Eichin. | |
| 4,064,673 | 12/1977 | Gerigk et al. | 17/41 X |
| 4,263,942 | 4/1981 | Lenhart et al. | |
| 4,312,384 | 1/1982 | Becker et al. | |
| 4,346,738 | 8/1982 | Martinek | 138/118.1 |

FOREIGN PATENT DOCUMENTS 806398 of 1981 South Africa.
1015716 1/1966 United Kingdom.

Primary Examiner—Willie G. Abercrombie
Attorney, Agent, or Firm—Michael L. Dunn

[57] ABSTRACT

This relates to the packaging of a casing stick within a sheathing in a manner wherein the casing stick may be readily handled in the required manner without undue damage to that end which is to be telescoped over the filling horn, while at the same time permitting the casing stick to be subjected to desired treatments such as moisturizing as is required, prior to the filling of the casing with a selected product. One end of the casing stick is provided with a calibrated ring which includes a sleeve that telescopes within the end of the casing stick and which has at one end a flange of a size generally to prevent external damage to the pleats of the casing stick. The sheathing of the package is inter-wound with the calibrated ring and the calibrated ring is provided with resilient fingers for locking the calibrated ring and the sheathing material on the filling horn.

10 Claims, 4 Drawing Figures

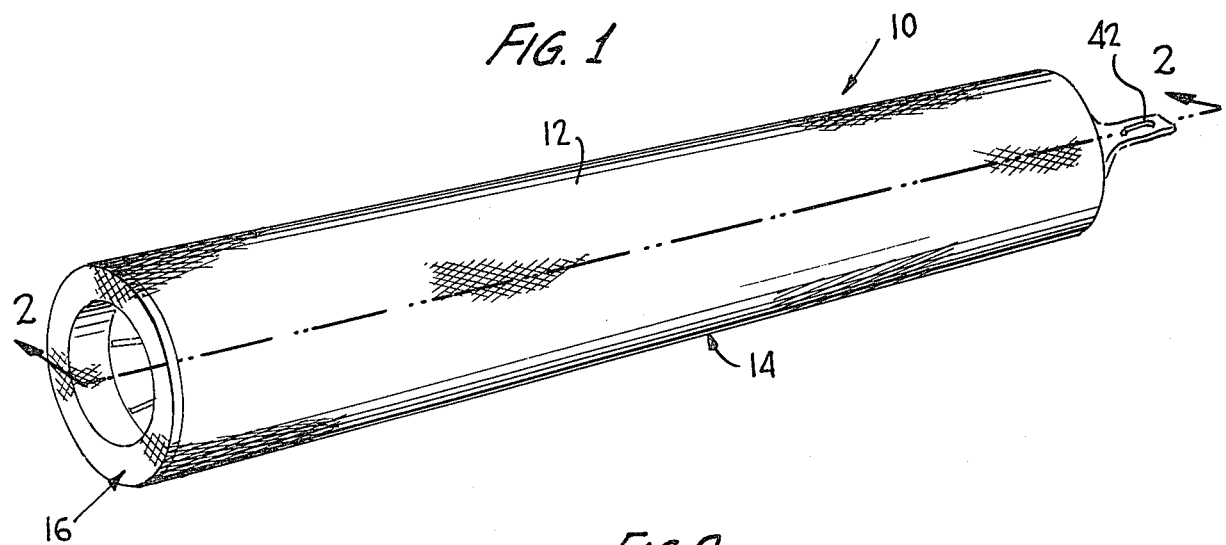
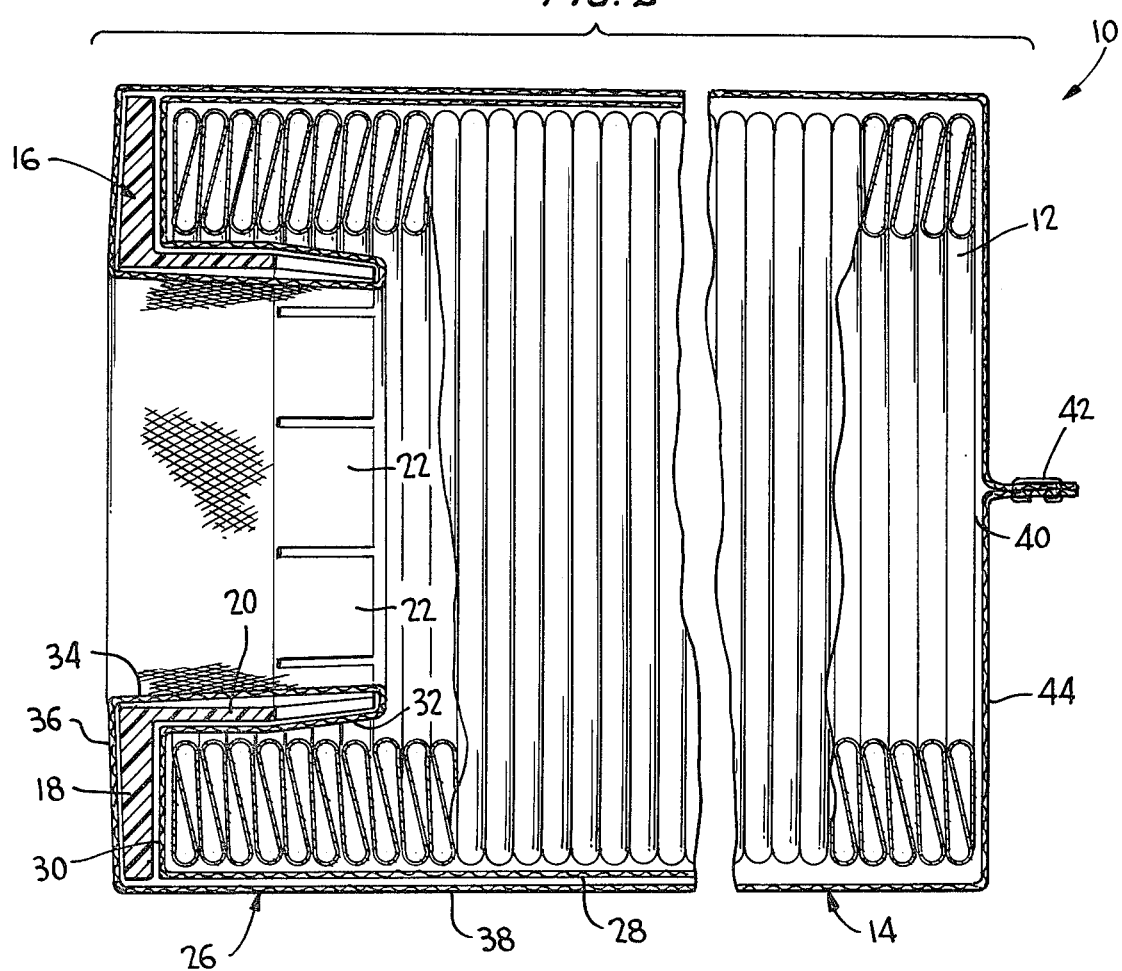

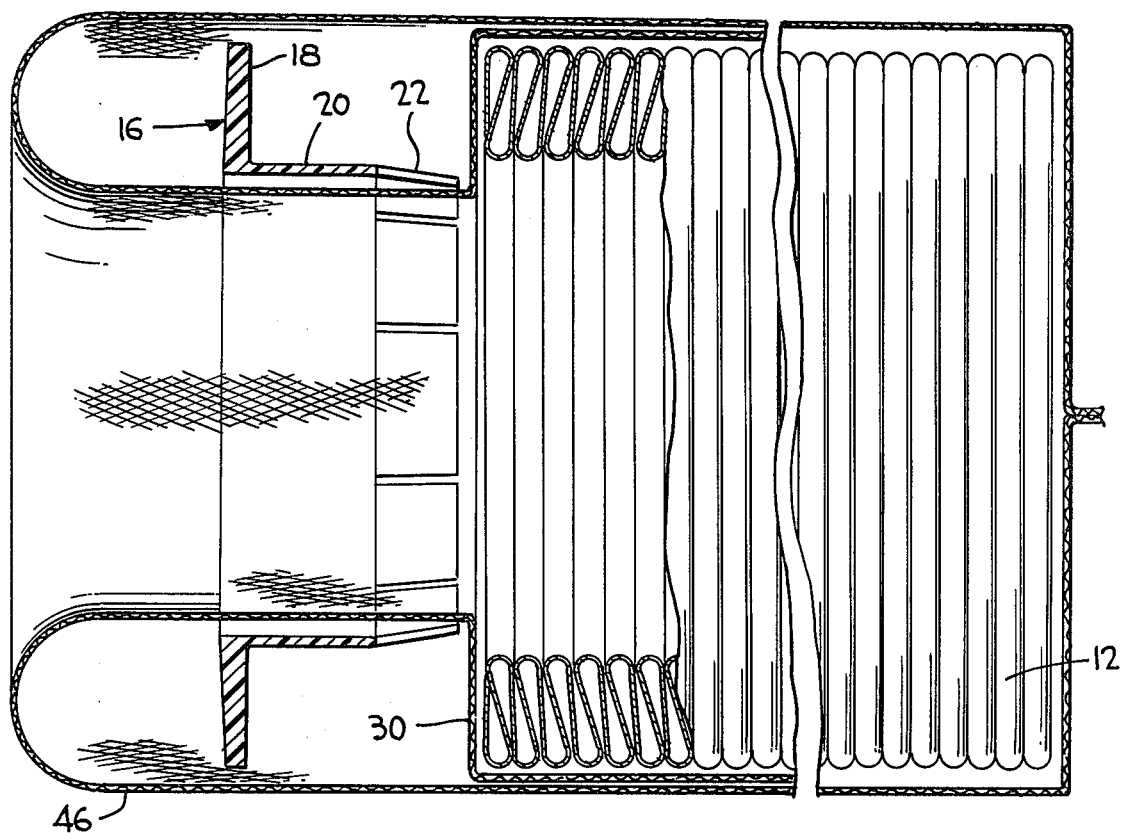
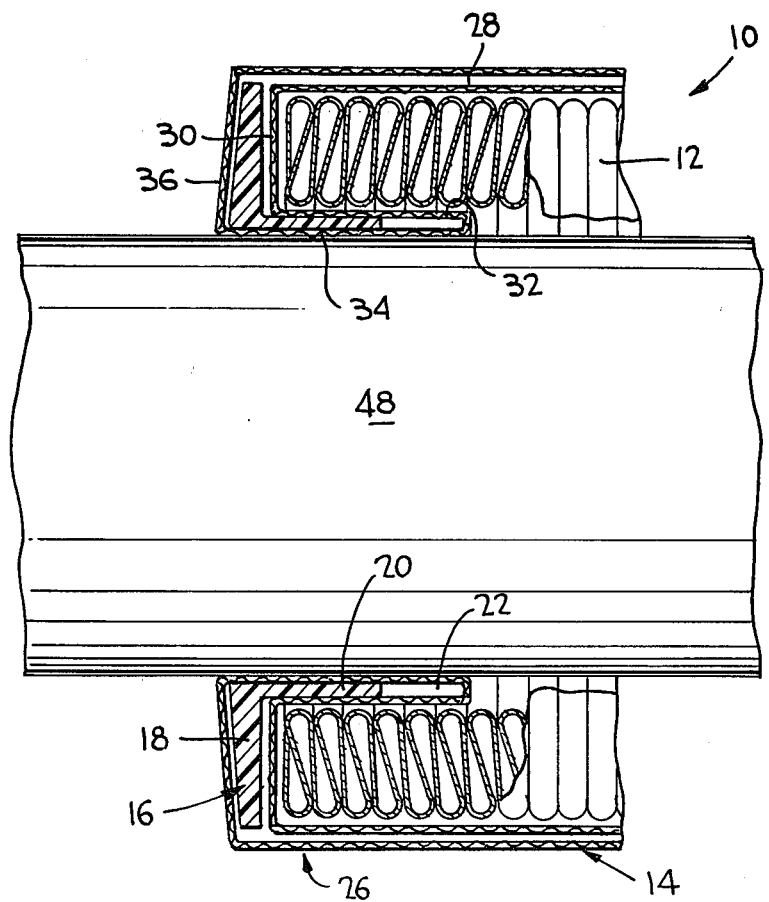

SHEATHED HOLLOW STICK OF SHIRRED CASING

This invention relates in general to new and useful improvements in shirred casing sticks, and more particularly to the packaging of such sticks.

In certain usage of shirred casings, it is desirable to package the casing stick in a suitable sheathing to maintain the stick clean and also to maintain its shape. The U.S. Pat. No. 4,013,099 to Gerigk et al, granted Mar. 22, 1977, discloses a known mode of packaging casing sticks of this type.

In accordance with this invention, one end of the casing stick is provided by a flexible calibrated ring which includes a sleeve which telescopes within the one end of the casing stick and is locked in place by a doubled in portion of the sheathing or net. This ring is of a size to protect the one end of the casing stick against damage and is also of a size to fit over the filling horn for which the casing stick is intended and to lock in place on the filling horn while at the same time locking to the filling horn the sheathing or net. In this manner, the casing may be paid out at the opposite end in the normal filling operation while assuring that the net remains secure on the filling horn and can in no way enter into the casing brake as it is being filled.

The provision of the calibrated ring, in addition to preventing damage to that one end of the casing stick which must be started over the filling horn, also serves to maintain the size of the casing even when the casing is soaked during moisturizing and wherein shrinking of the inside strand bore frequently occurs after such soaking.

The use of a net as the sheathing material also permits the free moisturizing of the strand while its shape is maintained by the package forming material including the calibrated ring.

In accordance with this invention, while the one end of the casing stick is fitted within the calibrating ring, the opposite end of the casing stick is free of any device except for the closed end of the sheathing which is opened prior to usage of the casing. The casing may thus be drawn from the open end of the stick and fed through any sizing rings, etc., associated with the filling horn while the opposite end of the casing stick is positioned on the horn and the net or sheathing is locked in place on the horn independently of the casing stick.

With the above and other objects in view that will hereinafter appear, the nature of the invention will be more clearly understood by reference to the following detailed description, the appended claims, and the several views illustated in the accompanying drawings.

IN THE DRAWINGS

FIG. 1 is a perspective view of a sheathed casing stick formed in accordance with this invention as viewed from the end thereof having the calibrated ring.

FIG. 2 is an enlarged longitudinal sectional view, with an intermediate portion broken away, of the sheathed casing stick of FIG. 1, taken along the line 2—2 of FIG. 1.

FIG. 3 is a sectional view similar to FIG. 2, and shows the manner in which the sheathing is initially wrapped around the calibrated ring prior to movement of the calibrated ring into position within the one end of the casing stick.

FIG. 4 is a fragmentary sectional view through the end of the casing stick having therein the calibrated ring, and shows the same mounted on a filling horn with the sheathing held in place by the calibrated ring.

Referring now to the drawings in detail, reference is first made to FIG. 1 wherein there is illustrated the sheathed tubular casing stick which is the subject of this invention, the sheathed casing stick being generally identified by the numeral 10. As is best shown in FIG. 2, the sheathed casing stick 10 includes a conventional stick of shirred casing 12 which is cylindrical and in the form of a tube. The shirred casing stick 12 is wrapped within a suitable sheathing generally identified by the numeral 14. The sheathing 14 is preferably in the form of a net so that the packaged shirred casing stick 12 may be suitably moisturized using a conventional process.

The invention particularly relates to the usage and advantages of a flexible calibrated ring 16 which is positioned at one end of the casing stick 12 and which is interfolded within an end portion of the sheathing 14 as will be described hereinafter.

The calibrated ring 16 includes a base flange 18 which is annular in outline and has a maximum external dimension which is at least equal to and preferably greater than the external dimensions of the cross section of the casing stick 12.

The flange 18 has projecting axially from the inner part thereof a sleeve 20 which is of a diameter to be freely received within the casing stick 12 and at the same time of a size to be snugly received over a filling horn to be described hereinafter.

The sleeve 20 is provided at the end thereof remote from the flange 18 with a plurality of locking or gripping fingers 22 which are circumferentially sepatated. It will be readily apparent that the fingers 22 slope radially inwardly and thus have an operative diameter less than that of the sleeve 20. Thus, when the calibrated ring 16 is telescoped over a filling horn, the fingers 22 will be deflected radially outwardly and will resiliently grip the filling horn to lock in place thereon and at the same time to lock in place the sheathing 14.

The sheathing 14 includes a folded in portion generally identified by the numeral 26. The folded in portion 26 includes a terminal end portion 28 which is telescoped over the one end of the casing stick 12. The folded in portion 26 also includes an annular portion 30 which extends from the exterior of the casing stick 12 across the one end thereof. To the portion 30 there is joined a portion 32 which extends axially between the sleeve 20 and the fingers 22 on the one hand and the inside of the casing stick 12 on the other hand.

The folded sheathing portion 26 next includes a portion 34 which extends axially from within the casing stick 12 through the calibrated ring 16 to the extreme end of the calibrated ring.

The folded portion 26 of the sheathing finally includes an annular portion 36 which extends across the outer face of the flange 18 and is joined to a body 38 of the sheathing 14. The body 38 is telescoped over both the terminal portion 28 of the sheathing and the casing stick 12 for the full length of the casing stick. The sheathing 14 is drawn close at the opposite end of the casing stick 12 as at 40 and secured together by means of some suitable type of tie or clamp 42. That portion of the sheathing 14 which extends across the opposite end of the casing stick 12 forms generally an end closure 44.

Reference is now made to FIG. 3 wherein there is shown how the calibrated ring 16 may be interwoven within the folded portion 26 of the sheathing. It will be seen that the terminal portion 28 of the sheathing may be first telescoped over the end portion of the stick 12, after which the sheathing 14 may be passed through the calibrated ring 16 and then reversely turned and telescoped over both the terminal sheathing portion 28 and the casing stick 12 so as to define a loop 46, as is best shown in FIG. 3.

After the loop 46 has been formed and with the calibrated ring 16 in place on the sheathing 14, the calibrated ring 16 may then be fed into the one end of the shirred casing stick 12 and, where necessary, the sheathing 14 may then be drawn taut along the exterior of the casing stick 12. Thereafter, the opposite end of the sheathing 14 is pulled together to form an end closure, after which it is suitably bound together as shown in FIG. 2.

The sheathed casing stick 10, in its packaged state, may be then readily handled and soaked to moisturize the same as required without fear of damaging at least the one end of the casing stick 12 so as to prevent the telescoping of the casing stick over the filling horn. When the casing is ready to be filled, it is telescoped over a filling horn, the horn 48 schematically shown in FIG. 4. The internal diameter of the sleeve 20 is one wherein it will snugly slide over the filling horn with the adjacent portion 34 of the sheathing 14 disposed between the calibrated ring and the horn. As the calibrated ring is continued to be fed over the horn 48, the fingers 32 engage the exterior of the filling horn 48 and are spread apart to the positions shown in FIG. 4. At this time the fingers 22 resiliently grip the exterior of the filling horn 48 through the sheathing material and serve both to lock the calibrated ring and the sheathing material in place on the filling horn 48.

The tied closed end of the sheathing is suitably opened in a manner wherein the casing may be dispensed therethrough while the sheathing generally remains in place around the casing stick. It will be readily apparent from FIG. 4 that while the calibrated ring 16 and the sheathing material remain clamped onto the filling horn 48, the casing is free to be paid out in its entirety, at the end of which the calibrated ring 16 and the casing 14 may be removed from the filling horn as a unit for suitable disposal. In view of the fact that the sheathing is positively locked in place on the filling horn, it will be seen that there is no danger of accidental entrance of any part of the packaging for the casing stick into the casing stick together with the product which is being filled into the casing.

Although only a preferred example of packaging the casing stick has been specifically illustrated and described herein, it is to be understood that minor variations may be made in the casing stick packaging and package construction without departing from the spirit and scope of the invention as defined by the appended claims.

We claim:

1. A sheathed hollow stick of shirred casing comprising an elongated shirred casing stick, a net-like sheathing telescoped over said stick in shape retaining relation and a unitary holding means comprising, a single flexible calibrated ring telescoped in one end of said stick, said ring including an inwardly projecting sleeve portion and said holding means being retained in said stick by a reversely folded portion of said sheathing.

2. A sheathed shirred casing stick according to claim 1 wherein said ring includes a sleeve portion of a preselected internal diameter for engaging over a filling horn of a preselected size for which said casing stick is intended, and said sleeve portion terminating in a plurality of retaining fingers arranged in a circumferentially separated relation and being radially inwardly directed to lock said ring and said sheathing on a filling horn.

3. A sheathed shirred casing stick according to claim 2 wherein said ring includes a terminal flange, said flange extending radially outwardly from said sleeve at the end of said sleeve remote from said fingers and being annular, said flange having an external size at least as great as the cross section of said stick to protect said stick and opposing said one end of said stick.

4. A sheathed shirred casing stick according to claim 3 wherein said sheathing has a terminal end portion telescoped over said stick, then extending between said stick one end and said flange, then into said stick around said sleeve, then reversely turned and through said sleeve and radially outwardly beyond said flange and then in telescoped relation over said sheathing terminal end portion and said stick beyond the opposite end of said stick, and means closing said sheathing at said stick opposite end.

5. A sheathed shirred casing stick according to claim 1 wherein said ring includes a sleeve portion telescoped within said stick and for engaging over a filling horn, and an annular flange extending radially outwardly from said sleeve and opposing said one end of said stick, said flange having an external size at least as great as the cross section of said stick for protecting said stick one end against undue deformation.

6. A sheathed shirred casing stick according to claim 5 wherein said sheathing has a terminal end portion telescoped over said stick, then extending between said stick one end and said flange, then into said stick around said sleeve, then reversely turned and through said sleeve and radially outwardly beyond said flange and then in telescoped relation over said sheathing terminal end portion and said stick beyond the opposite end of said stick, and means closing said sheathing at said stick opposite end.

7. A sheathed shirred casing stick according to claim 1 wherein said sheathing reversely folded portion includes a terminal sheathing portion telescoped over said stick, and a main portion of said sheathing being telescoped over said terminal sheathing portion and said stick.

8. A sheathed shirred casing stick according to claim 7 wherein said sheathing reversely folded portion extends from said terminal sheathing portion around said stick one end and into said stick, and then longitudinally out through said ring and around the exterior of said ring to said main portion.

9. The combination of a sheathed hollow stick of shirred casing and filling horn, said sheathed shirred casing stick comprising an elongated shirred casing stick and a net-like sheathing telescoped over said stick in shape retaining relation, and a unitary holding means comprising a single flexible calibrated ring telescoped in one end of said stick, said ring including an inwardly projecting sleeve portion and being retained in said stick by a reversely folded portion of said sheathing, and said sheathed shirred casing stick being telescoped over said filling horn with said ring facilitating positioning of said casing stick on said filling horn and clamping said sheathing to said filling horn against accidental introduction of said sheathing into the brake of a filling machine.

10. The sheathed casing stick of claim 1 wherein said reversely folded portion of said sheathing is formed by the terminal end portion of said sheathing telescoped over a portion of the exterior of said stick, then passed between said ring and said one end of said stick, then folded in reverse to pass over the outer end of said ring and then passed over the exterior of said stick.

* * * * *